United States Patent Office 3,579,474
Patented May 18, 1971

3,579,474
ELASTOMERIC COPLYMERS OF TETRAFLUORO-
ETHYLENE CONTAINING PHENOXYETHYL
GROUPS, AND THEIR VULCANIZATION
Rolland S. Ro, Wilmington, Del., assignor to E. I. du Pont de Nemours and Company, Wilmington, Del.
No Drawing. Filed Dec. 16, 1968, Ser. No. 784,234
Int. Cl. C08f 19/04, 45/24
U.S. Cl. 260—29.6
10 Claims

ABSTRACT OF THE DISCLOSURE

Novel elastomeric copolymers of tetrafluoroethylene with (1) (a) an alkyl vinyl ether, or either (b) an olefin which is from 50 to 100 mole percent of propylene, butene-1 or a mixture of them, any remainder being ethylene or isobutylene, or (c) ethylene and isobutylene in about equimolar proportions, and (2) 0.5 to 5 percent by weight of the product of a cure-site monomer which is an aryloxyalkyl vinyl ether, are made by catalytically uniting the components in an inert medium. The copolymer products are cleanly, quickly and efficiently cured by mixing with small amounts of polyformaldehyde or methylol-containing condensation products of formaldehyde with urea, phenol, or melamine under non-basic, preferably acidic, conditions to form novel elastomeric products having improved elastic properties.

BACKGROUND OF THE INVENTION (1) Field of the invention

This invention is in the field of improving the curing rates of certain tetrafluoroethylene/α-olefin copolymers or tetrafluoroethylene/alkyl vinyl ether copolymers, by providing novel copolymers having optimum cure sites.

(2) Description of the prior art

Copolymers of tetrafluoroethylene (TFE) with α-olefins such as propylene and isobutylene are disclosed in Hanford and Roland U.S. Pat. 2,468,664, but curing processes to give products having elastic properties are not discussed. Since this pioneer patent such copolymers have been developed having excellent elastic properties but the provision of polymers having optimum cure rates has remained a problem. Systems giving good cures of TFE-propylene elastomers are available but the rate of cure is slow and the processes are difficult to control. On the other hand, excessively rapid cures tend to give products which are too hard and are often deficient in other elastomeric properties.

It has been recognized that cure rates and the properties of cured polymers are dependent upon the number and type of cure sites available for cross-linking via the curing agent. In Pattison U.S. Pat. 3,306,879, units having the formula

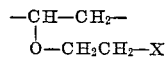

where X is chlorine, bromine or iodine, hydroxyl, or a radical of the structure

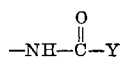

where Y is hydrogen or a saturated hydrocarbon radical containing 1 to 8 carbon atoms are copolymerized with TFE and various alkyl vinyl ethers to provide cure sites in the copolymer produced. Such copolymers have active cure-sites but do not possess optimum cure rates.

The present invention is concerned with cure-site agents which have a different structure from those of Pattison and which provide better, more easily controlled curing rates when cured with formaldehyde polymers.

SUMMARY OF THE INVENTION

Now according to the present invention it has been found that copolymers of tetrafluoroethylene and certain α-olefins or alkyl vinyl ethers can be provided with optimum cure rates by copolymerizing them with from 0.5 to 5% by weight of an aryloxyalkyl vinyl ether monomer of the formula:

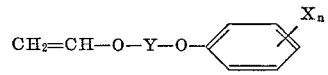

where Y is an alkylene radical of 2 to 4 carbons, and X is a radical of the group consisting of alkyl and alkoxy groups, there being no more than 4 carbon atoms in any one alkyl or alkoxy group and $n$ being from 0 to 2.

It has further been found the copolymers so produced can be cured by mixing them, under non-basic, preferably acidic, conditions, with small amounts of a formaldehyde polymer, particularly paraformaldehyde, or with methylol-containing condensation products of formaldehyde with urea, phenol or melamine, and heating. The novel elastomeric products so produced have excellent elastic properties.

DESCRIPTION OF PREFERRED EMBODIMENTS

The copolymerization of α-olefins or alkyl vinyl ethers with TFE is already well known in the art—see for instance the Hanford et al. U.S. Pat. 2,468,664 noted above. In the present invention such copolymerization is further modified by inclusion of a third component which is an aryloxyalkyl vinyl ether, to form a terpolymer having improved cure-sites for vulcanization or cross-linking. The second monomer of the copolymerization can be an alkyl vinyl ether or an olefin or mixture of olefins which is from 50 to 100 mole percent of propylene, butene-1 or a mixture of them, any remainder being ethylene or isobutylene, or the olefin can be ethylene and isobutylene in about equimolar proportions. When the second monomer is an alkyl vinyl ether, the alkyl group is preferably methyl, ethyl or propyl.

The molar proportions of TFE and copolymerizable olefinic compound in the product can vary from 0.85 to 1.25 moles TFE per mole of olefinic compound, a ratio of from 0.9:1 to 1.2:1 being preferred.

The copolymerization is catalytically promoted using catalysts already known in the art. The polymerization systems disclosed in Brasen and Cleaver U.S. Ser. No. 577,799, filed Sept. 8, 1966; issued Sept. 16, 1969, as U.S. Pat. 3,467,635, can, for instance, be used. An ammonium persulfate catalyst, in combination with pH adjusters such as sodium hydroxide, soaps such as ammonium perfluorooctanate and promoters such as sodium sulfite and cupric sulfate, for instance, can be used. Ordinarily the amount of catalyst will be from 0.5 to 20% by weight, based on the weight of polymer to be formed.

Generically, the cure-site monomer which is copolymerized with the TFE and α-olefin has the formula:

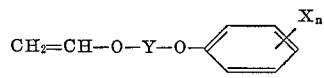

Y can be an alkylene radical with 2 to 4 carbon atoms, ethylene being preferred as in phenoxyethyl vinyl ether (PEVE). X can be methyl, ethyl, n-propyl, isopropyl, t-butyl, methoxy, ethoxy, n-propoxy, or t-butoxy. N can be 0, 1 or 2, a value of 0 meaning that there is no substitution of the phenyl ring.

The conditions under which the monomers, including the cure-site monomer are copolymerized can be the same as those disclosed in the above-identified Brasen and Cleaver application Ser. No. 577,799 and said disclosures are herein incorporated by reference. In one convenient method, the monomers to be polymerized are heated to a temperature of about from 35° to 160° C. in a closed system with agitation under moderate superatmospheric pressures, e.g. about 300 to 2500 p.s.i.g.

Conventional free-radical initiators such as peroxides, azonitriles, and alkali metal or ammonium persulfates, can be used as initiators. Organic-soluble initiators (i.e. initiators soluble in typical organic solvents), particularly organic peroxides such as benzoyl peroxide, tert-butyl peroxypivalate, and tert-butyl peroxide, are suitable. The temperature will, of course, be determined largely by the particular initiator used. Water or fluorocarbon solvents such as 1,1,2-trichloro-1,2,2-trifluoroethane (F–113), for instance can be used as the medium. Tert-butyl alcohol is also suitable, especially when mixed with water.

The preferred processes are well known free-radical emulsion polymerizations. Thus, water-soluble persulfates are the preferred catalysts, sodium bisulfite is preferred if an activator is used, sodium phosphate is a suitable buffer, and the salts of perfluoroacids, for example ammonium perfluoro-n-octanoate, are preferred as surfactants but hydrocarbon surfactants, e.g. sodium laurate, are operable. Preferred temperatures are in the range of 50° to 100° C., and preferred pressures in the range of 500 to 2200 p.s.i.g.

The poportion of cure-site monomer incorporated into the terpolymer is broadly from 0.5 to 5% by weight. Preferred products are obtained using from 1 to 3%. If more than 5% is used vulcanizates tend to be overcured, and if less than 0.5% is used the product cures too slowly and sometimes incompletely.

A typical polymer before vulcanization would display the gross physical properties of an uncured rubber. It would be soft and extendable, would flow under modest stress or at elevated temperatures and would be soluble in appropriate solvents. It would have a fluorine content of about 55% by wt., depending on the exact amount of TFE incorporated therein and an inherent viscosity, measured as a 0.5% solution in equal parts of F–113/tetrahydrofuran of 0.3–1.5. The infra-red spectrum of a thin film of the polymer would show, in addition to bands typical of TFE/olefin copolymers, absorption at $6.3\mu$ and $6.75\mu$ characteristic of the phenyl ring of the aryloxyalkyl vinyl ether. The U.V. spectrum of a solution of the polymer in equal parts of F–113 and tetrahydrofuran would show maxima at 270 and 277 m$\mu$.

The terpolymers, even without vulcanization, can be used in coating compositions. Their principal use, however, is in cured form—that is, in combination with a curing or vulcanizing agent which acts as a cross-linking agent for the cure-sites which have been incorporated into the terpolymer. According to a further aspect of this invention, such curing is effected with formaldehyde polymers, by mixing the two components under non-basic conditions and heating.

The formaldehyde curing agent can be paraformaldehyde; trioxane; formaldehyde tetramers; "Delrin" acetal resins, either capped or uncapped, and methylol-containing formaldehyde condensation products with phenols (including substituted phenols), melamines and ureas; or the carboxylate esters of such polymers.

The curing is effected under non-basic conditions. With certain of the polymers no addition of acid is required. With others, the acidity can be provided by adding such agents as stannous or stannic chloride, oxalic acid, phthalic acid, p-toluene sulfonic acid or the like. Preferred are systems which grow more acidic upon heating such as those wherein the acidifying agent is an alkyl sulfonate, e.g. sec.-butyl p-toluene sulfonate, or isopropyl p-toluene sulfonate. In any event, no basic oxides should be incorporated into the system.

To effect the cure the terpolymer is mixed at temperature below 100° C. with from 0.5 to 5% preferably by weight of the formaldehyde polymer, as on a 2-roll compounding mill, and an acidic catalyst if needed. Typically the mix is cured for 10 to 60 minutes in a press at 120° to 200° C., then in an air-circulating oven for 2 to 30 hours at elevated temperatures, e.g. 100° to 250° C., preferably 24 hours at 200° C.

The cured polymers have excellent elastic properties, the properties of a typical compounded vulcanizate being as follows:

EFFECT OF HEAT-AGING VULCANIZATE

Compounding formula

|  | Parts by weight |
|---|---|
| Polymer of Example 4 | 100 |
| MT Black | 20 |
| Paraformaldehyde | 1 |
| 2-propyl tosylate | 1 |

Cure

Press-cure: 30 min. at 160° C.
Post-cure: 4 hrs. step to 204° C.+24 hrs. at 204° C.

PROPERTIES

| Property | Original | After 1 day at 288° C. | After 7 days at 204° C. | After 14 days at 204° C. |
|---|---|---|---|---|
| TB, p.s.i. | 2,100 | 1,400 | 2,000 | 1,850 |
| M$_{100}$, p.s.i. | 1,550 | 650 | 1,150 | 900 |
| Percent elongation at break | 120 | 135 | 130 | 145 |
| Percent set after break (ASTM D412-66) | 2 | 1 | 1 | 1 |
| Hardness, Shore A | 64 | 65 | 66 | 65 |
| Comp. set, percent: | | | | |
| 70 hours at 121° C | 8 | 10 | 6 | 6 |
| 70 hours at 204° C | 32 | | 32 | 33 |

FLUID RESISTANCE

| Solvent: | Percent volume increase of vulcanizate [1] |
|---|---|
| Cyclohexane | 10 |
| ASTM Oil No. 3 | >5 |
| Conc. H$_2$SO$_4$ | >5 |
| 70% HNO$_3$ | >5 |
| 46% NaOH | >5 |
| Methanol | >5 |
| Ethanol | >5 |
| Ethylene diamine | 10 |
| Dimethyl formamide | 30 |

[1] After 7 days soaking at room temperature.

The cured polymers have utility for those uses in which polymers having resiliency and resistance to high temperatures, oils and solvents have been found effective. These include coatings, such as for wire, and in tubing, O-rings and gaskets, particularly where subjected in use to relatively high temperatures or the action of organic solvents.

The invention will be better understood by reference to the following illustrative examples:

EXAMPLE 1

In a 400 ml. Hastelloy shaker tube were placed 200 ml. distilled water, 1.1 g. ammonium persulfate, 1.0 g. sodium hydroxide, 0.5 g. sodium sulfite, 1.0 g. ammonium perfluorooctanoate (FC–126) and 3.0 g. 2-phenoxyethyl vinyl ether. It was cooled in a Dry-Ice-acetone bath and evacuated. It was then charged with 15.0 g. propylene and 48.5 g. tetrafluoroethylene (TFE). The mixture was shaken at 60° C. under autogenous pressure for 4 hours. A latex was obtained from which 7 g. of the terpolymer was isolated by coagulation with dilute hydrochloric acid. The infrared spectrum of the terpolymer showed typical phenyl group absorptions ($6.3\mu$, $6.7\mu$) indicating the incorporation of PEVE.

EXAMPLE 2

This example illustrates the usual method for preparation of a polymer of the invention with S$_2$O$_8$=/SO$_3$= catalyst in a continuous flow apparatus.

A 1-gallon stainless steel autoclave was filled with equal volumes of catalyst solutions A and B in deoxygenated water, as follows:

Catalyst A 0.04 mole/l. of ammonium persulfate
0.15 mol/l. of sodium hydroxide
2 wt. percent ammonium perfluorooctanoate

Catalyst B 0.04 mole/l. of sodium sulfite
5 p.p.m. of $Cu^{++}$ as cupric sulfate The pressure was brought up to 600 p.s.i.g. and the temperature to 60° C. TFE, propylene and 2-phenoxyethyl vinyl ether were fed at 600 p.s.i.g. into the autoclave in the molar ratio 1.5/1.0/0.03 respectively at a rate of 5 moles total gas/hour. Both catalyst solutions A and B were pumped into the autoclave at the rate of 600 ml./hr. each. The polymerization mixture was allowed to overflow through a Grove pressure regulator set at 600 p.s.i.g. The temperature was maintained at 60° C. throughout the run. When equilibrium was achieved, about 1400 cc./hr. of latex was produced. This latex was coagulated with dilute HCl and washed with water and methanol to give about 280 g./hr. of the terpolymer.

The inherent viscosity of the tempolymer was found to be 0.7 (measured as a 0.5% solution in 1:1 F-113/acetone at 30° C.). The polymer composition was approximately 55 mol percent TFE, 44 mol percent P and 1% PEVE.

EXAMPLE 3

This example illustrates the vulcanization of the polymer prepared in Example 2. With this polymer no separate acid catalyst is required in the vulcanization step.

The (TFE/P/PEVE) fluoroelastomer prepared in Example 2 was mixed on a cold two roll mill with 20 phr. of MT carbon black and the formaldehyde condensation products listed in the table. Test specimens were cured for 30 min. in a press at 120° to 160° C. and then in an air circulating oven for 24 hours at 204° C. The listed physical properties were determined by standard methods (ASTM D-412 and D-395 method B), and show that effective vulcanization occurred.

After reaching equilibrium, about 340 g./hr. of the terpolymer was obtained.

The composition of the terpolymer was estimated from monomer fed and off gases to be approximately 55 mole percent TFE, 44 mole percent propylene and 1 mole percent PEVE. The inherent viscosity of the terpolymer was found to be 0.5 (measured as 0.5% solution in 1:1 "Freon"-113 fluorocarbon/acetone at 30° C.).

EXAMPLE 5

This illustrates vulcanization of the polymer of Ex. 4 with this polymer, wherein addition of an acidic catalyst is required.

The fluoroelastomer prepared in Ex. 4 was mixed on a two roll mill with 20 phr. of MT carbon black and the ingredients listed in the table, paraformaldehyde being the curing agent. Test specimens were cured in a press for 30 min. at 160° C. and then for 24 hours at 204° C. in an air circulating oven. Samples were tested by standard methods (ASTM D-412 and D-395 method B).

PHYSICAL PROPERTIES

| Amount paraformaldehyde, percent | Acid catalyst | Amt. | $M_{100}$ (p.s.i.) | $T_B$ (p.s.i.) | $E_B$, percent | $S_B$, percent | Hardness | Comp. set 70-121° C. |
|---|---|---|---|---|---|---|---|---|
| 0.5 | 2-propyl-p-toluenesulfonate | 0.5 | 550 | 2,100 | 180 | 3 | 57 | 8 |
| 1 | do | 1 | 1,550 | 2,100 | 120 | 2 | 69 | 8 |
| 2 | do | 1 | 1,100 | 2,000 | 130 | 1 | 63 | 7 |
| 1 | 2-butyl-p-toluenesulfonate | 2 | 450 | 1,900 | 180 | 2 | 60 | 19 |
| 1 | Maleic acid | 1 | Samples were cured but bubbles prevented testing. | | | | | |
| 1 | o-Phthalic acid | 2 | | | | | | |
| 1 | Oxalic acid | 1 | | | | | | |
| 0.5 | Perfluorooctanoic acid | 0.5 | Samples were insoluble in the solvent system of Example 4.[1] | | | | | |
| 0.5 | Perfluorobenzoic acid | 0.5 | | | | | | |

[1] They were originally soluble in this system.

EXAMPLE 6

This example illustrates preparation of a tetrafluoroethylene/methyl vinyl ether/phenoxyethylvinyl ether tripolymer and its vulcanization with paraformaldehyde.

In a 400 ml. stainless steel shaker tube was placed: 200 ml. distilled water, 0.1 g. sodium sulfite, 1 g. ammonium perfluorooctanoate, 0.6 g. sodium carbonate, 0.4 g. ammonium persulfate, and 1.23 g. of 2-phenoxyethyl vinyl ether. The shaker tube was cooled in a Dry Ice-acetone bath and evacuated. Then 16 g. methyl vinyl ether and 24 g. of tetrafluoroethylene was added. The mixture was shaken at 60° C. for 4 hours. A latex was obtained, from which 36 g. of the terpolymer was isolated by freeze coagulation, followed by thorough water washing and drying.

The curing of this elastomer was accomplished by compounding on a cold rubber mill with curing agents as shown in the table, and curing 30 minutes at 165° C. Samples were postcured in an oven 24 hours at 204° C. and tested.

PHYSICAL PROPERTIES

| Curing agent | Amt. (phr.) | $M_{100}$ (p.s.i.) | $T_B$ (p.s.i.) | $E_B$ percent | $S_B$. percent | Hardness | Comp. set 70-121° C |
|---|---|---|---|---|---|---|---|
| 2,6-bis-hydroxy methyl-p-cresol [1] | 1 | 1,350 | 1,920 | 120 | 2 | 71 | 47 |
| Paraformaldehyde | 1 | 1,680 | 2,050 | 120 | 2 | 68 | 20 |
| SP-1055 [2] | 2 | 1,300 | 2,600 | 150 | 3 | 66 | 59 |
| Hexahydroxymethylmelamine | 1.5 | Samples were cured, but bubbles prevented testing. | | | | | |
| Hexamethoxymethylmelamine | 1.5 | | | | | | |
| Dimethylol urea | 1.5 | | | | | | |
| Uncapped "Delrin" [3] | 1 | 1,600 | 1,600 | 100 | 0 | 70 | 21 |
| Acetate-capped "Delrin" [3] | 1 | | 1,500 | 80 | 1 | 70 | 20 |

[1] Contained 30 phr. MT black.
[2] Schenectady Chemical Co. bromoethyl alkylated phenol formaldehyde resin M.P. 120-130° F.
[3] E. I. du Pont de Nemours & Co. formaldehyde polymer.

EXAMPLE 4

This example illustrates preparation of a polymer of the invention with $S_2O_8^=$ catalyst alone.

The procedure described in Example 3 was used except that the polymerization temperature was 100° C. and the solution B was changed to 0.04 M sodium hydroxide.

COMPOUNDING RECIPE

| | G. |
|---|---|
| Polymer | 30 |
| MT carbon black | 15 |
| Isopropyl tosylate | 0.3 |
| Paraformaldehyde | 0.3 |

After press cure, 30 min. 165° C. and oven postcure, 24 hours at 204° C., the properties of the product were:

$M_{100}$ ---------------------------------------- 400
$T_B$ ------------------------------------------- 900
$E_B$ ------------------------------------------- 300
Shore hardness ---------------------------------- 73

Compression set:

70 hr., 25° C. ---------------------------------- 51
70 hr., 121° C. --------------------------------- 55

I claim:
1. A terpolymer of tetrafluoroethylene with (1) a copolymerizable olefinic component selected from the group consisting of (a) alkyl vinyl ethers having 1 to 3 carbon atoms in the alkyl radical, (b) olefins which consist of from 50 to 100 mole percent of an olefin selected from the group consisting of propylene, butene-1, and mixtures of them in any proportion, any remainder being of the group consisting of ethylene and isobutylene, and (c) ethylene and isobutylene in about equimolar proportions, and (2) from 0.5 to 5% by weight of an aryloxyalkyl vinyl ether cure-site monomer of the formula

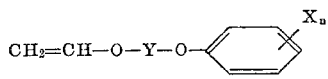

where Y is an alkylene radical of 2 to 4 carbon atoms, X is a radical of the group consisting of alkyl and alkoxy groups, there being no more than 4 carbon atoms in any one alkyl or alkoxy group and $n$ being from 0 to 2, the polymer being characterized by being readily vulcanizable with polymers of formaldehyde.

2. A terpolymer of claim 1 in which the cure-site monomer is phenoxyethyl vinyl ether.
3. A terpolymer of claim 1 in which the olefinic component is propylene.
4. A terpolymer of claim 1 in which the olefinic component is a mixture of ethylene and isobutylene.
5. A terpolymer of claim 1 in which the olefinic component is an alkyl vinyl ether.
6. A terpolymer of claim 5 in which the cure-site monomer is phenoxyethyl vinyl ether.

7. In a process for curing a terpolymer of tetrafluoroethylene with (1) a copolymerizable olefinic component selected from the group consisting of (a) alkyl vinyl ethers having 1 to 3 carbon atoms in the alkyl radical, (b) olefins which consist of from 50 to 100 mole percent of an olefin selected from the group consisting of propylene, butene-1, and mixtures of them in any proportion, any remainder being of the group consisting of ethylene and isobutylene, and (c) ethylene and isobutylene in about equimolar proportions, and (2) from 0.5 to 5% by weight of an aryloxyalkyl cure-site monomer of the formula

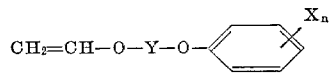

where Y is an alkylene radical of 2 to 4 carbon atoms, X is a radical of the group consisting of alkyl and alkoxy groups, there being no more than 4 carbon atoms in any one alkyl or alkoxy group and $n$ being from 0 to 2, the steps comprising mixing the terpolymer with from 0.5 to 5% by weight of a formaldehyde polymer and heating the mixture under non-basic conditions at a temperature of from 120 to 160° C. for about one-half hour and then at about 200° C. for about 24 hours.

8. The cured product of a process of claim 7.
9. An aqueous latex of a terpolymer of claim 1.
10. A latex of claim 9 wherein the copolymerizable olefinic component of the terpolymer is propylene and the aryloxyalkyl vinyl ether cure-site monomer is 2-phenoxyethyl vinyl ether.

References Cited
UNITED STATES PATENTS

| | | | |
|---|---|---|---|
| 3,070,577 | 12/1962 | Stogryn | 260—62 |
| 3,131,166 | 4/1964 | Harris | 260—47 |
| 3,306,879 | 2/1967 | Pattison | 260—77.5 |
| 3,449,305 | 6/1969 | Stilmar | 260—80.76 |

JOSEPH L. SCHOFER, Primary Examiner

C. A. HENDERSON, Jr., Assistant Examiner

U.S. Cl. X.R.

117—128.4; 260—47, 52, 80.76, 847, 853, 856, 897